March 14, 1961 R. J. TEITEL 2,974,942
MEANS FOR PROCESSING NUCLEAR REACTOR FUEL ELEMENTS
Filed Aug. 7, 1959 2 Sheets-Sheet 1

INVENTOR.
Robert J. Teitel
BY Earl D. Ayers
AGENT

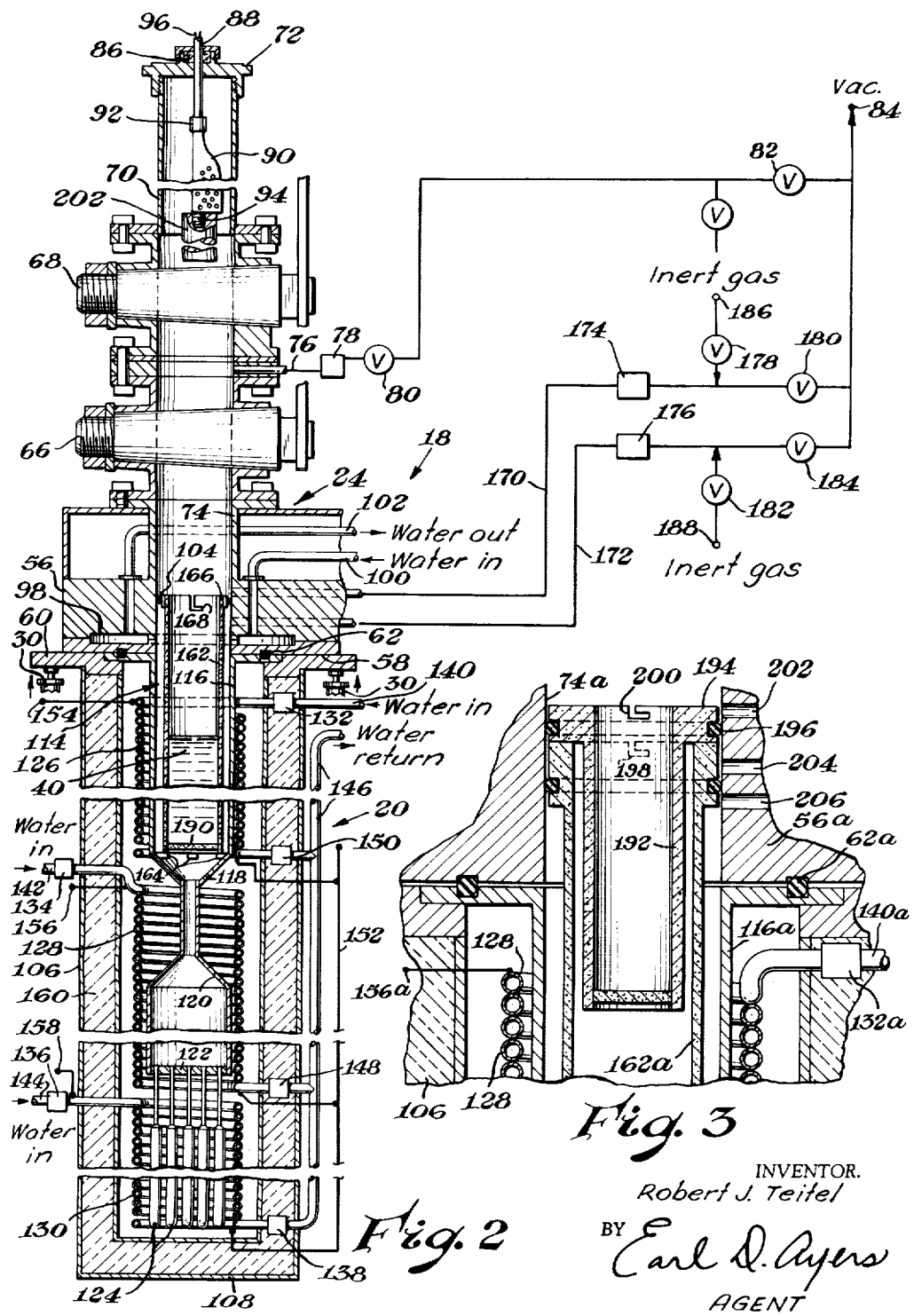

United States Patent Office 2,974,942
Patented Mar. 14, 1961

2,974,942
MEANS FOR PROCESSING NUCLEAR REACTOR FUEL ELEMENTS

Robert J. Teitel, Midland, Mich., assignor to The Dow Chemical Company, Midland, Mich., a corporation of Delaware Filed Aug. 7, 1959, Ser. No. 832,341

5 Claims. (Cl. 266—9)

This invention relates to a novel method and means for processing and pyrometallurgically refining nuclear reactor fuel elements and is particularly well adapted to the processing of spent nuclear reactor fuel elements in a highly radioactive state.

Heretofore spent fuel elements and fuel element fabrication scrap have been refined by chemical rather than pyrometallurgical processing methods. Chemical methods are subject to certain serious disadvantages such as the use of large quantities of corrosive acid solutions, the handling of large volumes of solutions, the numerous processing steps and the difficulties attendant with the handling of highly radioactive materials during the lengthy and time-consuming processing, and the problem of disposing of radioactive waste solutions. These problems are overcome by the use of the processing method and apparatus hereinafter disclosed and claimed.

It is an object of the present invention to provide an improved method for the processing of nuclear reactor fuel elements.

It is a further object of the invention to provide a method for the processing of nuclear reactor fuel elements which may be readily carried out by remote control.

It is a still further object of the invention to provide improved apparatus suitable for processing nuclear reactor fuel elements.

The invention, as well as additional objects and advantages thereof, will best be understood when the following detailed description is read in connection with the accompanying drawings in which:

Fig. 2 is a side elevational view, in section and with some parts shown schematically, of part of the apparatus shown in Fig. 1, and Fig. 3 is a fragmentary side elevational view, on an enlarged scale, of alternative pyrometallurgical apparatus for use in practicing the method of this invention.

Figure 1:
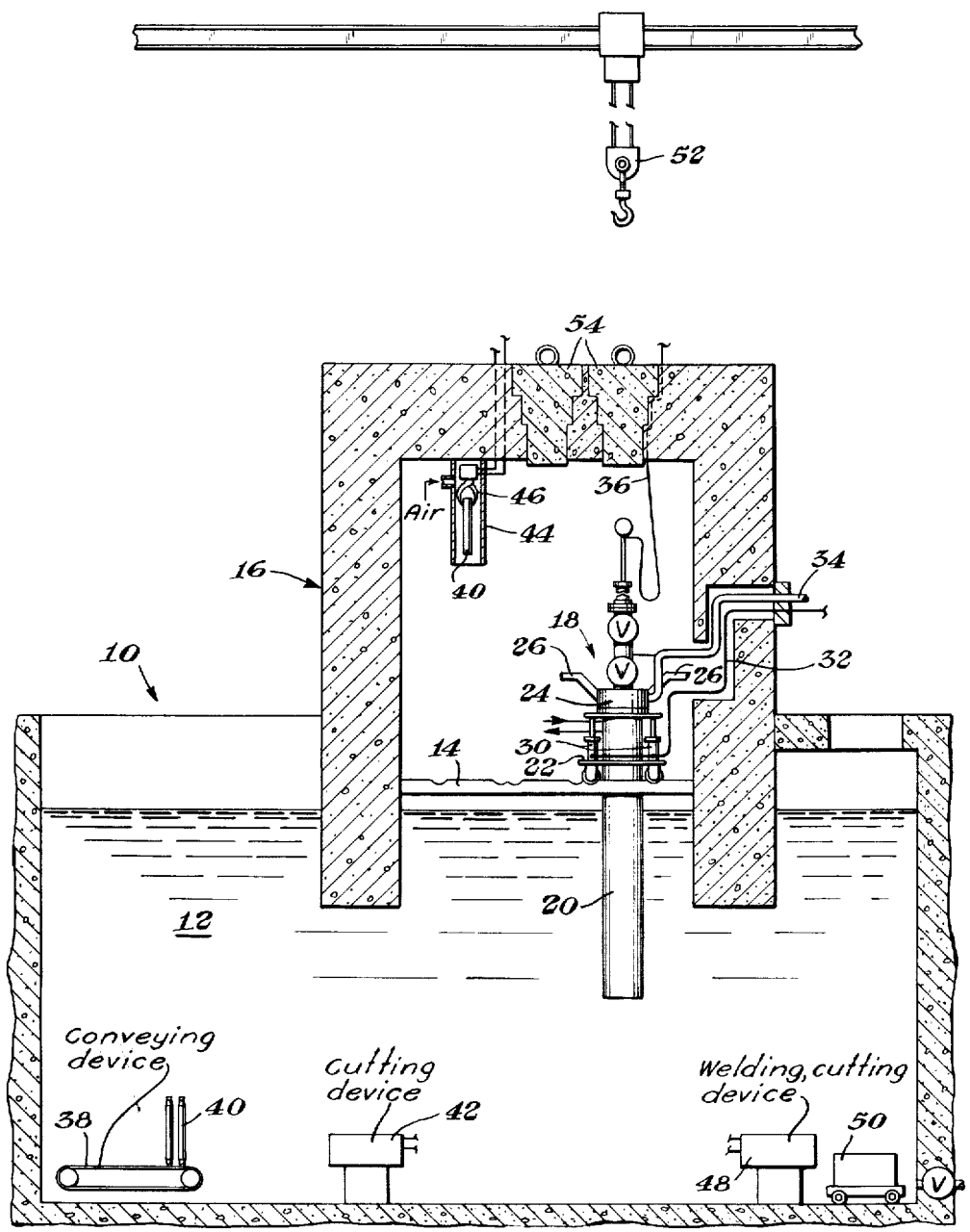
Fig. 1 is a diagrammatic view of apparatus suitable for carrying out the method of this invention.

Referring to Fig. 1, there is shown a subterranean pool 10 which is filled with water 12 to near the level of the transverse tracks 14 which extend across the concrete shielding housing, indicated generally by the numeral 16. Pyrometallurgical apparatus, indicated generally by the numeral 18, and which will be described in greater detail with respect to other figures of the drawings, has its lower section 20 supported by the wheeled truck 22 which is movable along the tracks 14. The upper section 24 of the pyrometallurgical apparatus 18 is held in fixed spatial relationship within the radiation shielding housing 16 by means of brackets 26. The truck 22 is provided with suitable means, such as hydraulic jacks 30, for raising and lowering the lower section 20 with respect to the upper section 24. The jacks 30 are actuated by means of suitable hydraulic cable 32 and controls (not shown) disposed at a location remote from the housing 16. Other leads for power, coolant, vacuum lines, gas lines, and other control lines to and from the apparatus 18 are indicated, for the sake of simplicity, as passing through the large single cable 34, although in actual practice separate cables, hoses or tubes are used. Other leads, such as the instrumentation lead 36 extending upwardly from the aparatus, extend from the apparatus to remote indicator means. The lead 36, for example, connects thermocouples which are disposed within the pyrometallurgical apparatus to remote temperature indicators (not shown).

Since the pyrometallurgical apparatus is to be used to process MTR (materials testing reactor) fuel elements or similar elements, apparatus is provided within the pool for mechanically handling and preparing the elements for use in the pyrometallurgical apparatus. For example, the elements to be processed are placed on a conveying device 38 which may extend from an adjacent reactor pool or, as illustrated, be disposed entirely within the pool 10. The reactor elements 40 are transported on the conveying device 38 to, or near to, a cutting device 42 which is used to trim the ends or non-fissionable parts of the elements 40 before the elements are processed in the apparatus 18. After the end parts of the apparatus have been removed, each element 40 to be processed is drawn into a drying and cooling chamber 44 by the remotely controlled draw works 46. Means are provided to inject air or other drying and cooling agent into the upper part of the chamber 44.

For reasons which will be explained later, a welding and cutting device 48 and a storage and moving cart 50 are provided at the bottom of the pool.

A movable hoist 52 is provided above the housing 16 for removing the "plugs" 54 in the top of the housing as well as for raising and lowering materials which are to be placed into or removed from the pyrometallurgical apparatus 18.

Remotely controllable tools (not shown) for handling the radioactive elements 40 while they are in the water 12 are well known and may be controlled from above the surface of the pool.

Referring now to Fig. 2, it may be seen that the pyrometallurgical apparatus 18 comprises an upper section 24 and a lower, movable section 20 which is supported by hydraulic jacks 30.

The upper section comprises a header 56 having a lower surface 58 which is adapted to bear against the upper surface 60 (or an extension thereof) of the lower section 20. An O ring seal 62 is provided between the surface 58, 60.

A pair of valves 66, 68 and a tubular section 70 having an upper end cap 72 are disposed above the header 60. The throats of the valves 66, 68 are axially aligned with and preferably when open the valve passageway is at least as large as the transverse cross sectional configuration of the section 70. The valve 66 is disposed immediately above and sealed to the header 56 with the valve throat axially aligned with the bore 74 through the header 60. The valve 68 is sealed to the valve 66 with a vacuum line 76 connected between the valves and communicating with the valve throats. The vacuum line 76 is connected through a suitable (charcoal) filter 78 and valves 80, 82 to a vacuum system, as indicated at the arrow 84.

The top cap 72 contains a packing gland 86 through which a rod 88 extends. A paddle-like mixing or agitating blade 90, as well as a thermocouple element 92 are coupled to the lower end of the rod 88. The lower end of the blade 90 has a coupling element 94 for attaching a slug of material to the blade (or for attaching another mechanical device thereto). Leads 96 extend upwardly from the thermocouple 90 and may be connected to a suitable indicator (not shown).

Because the header 60 is disposed adjacent to the lower part 20 of the pyrometallurgical apparatus in which melting of material composing the elements 40 takes place, the header 60 contains an annular water cooling duct 98 to which water inlet and outlet tubes 100, 102, respectively, are coupled. The cooled header thermally protects the O ring 62 and the O ring 104 within the bore 74 of the header 60.

The lower section 20 of the pyrometallurgical apparatus comprises an elongated double walled thermally insulated tubular member 106 illustrated as having a closed lower end 108 and an outwardly extending flange 110 at its upper end. The flange 110 has an upper surface 60, previously mentioned, which has a section machined to accept the flange 112 which forms an extension of the surface 60 and bears against the O ring 62 previously referred to. The member 106 is conveniently made in circular cross sectional configuration and the hollow inner part of the member is somewhat larger in cross section than is the bore 74 of the header 60. The outwardly extending flange 112 is at the upper end of a metal walled melting chamber or "well," indicated generally by the numeral 114. The melting chamber or well 114 has an upper section 116 having approximately the same inner diameter as the diameter of the bore 74 of the header 60. An intermediate section 118 shaped as two round funnels having their spouts joined end-to-end joins the upper section 116 to a lower tubular section 120 of generally (but not necessarily) the same inner diameter as the inner diameter of the upper "well" section 116. The bottom 122 of the lower section 120 has a number of hollow tubes 124 each having a neck of restricted diameter extending downwardly therefrom. The tubes are hollow and their interior parts communicate with the lower "well" section 120 through apertures in the bottom part 122 thereof.

Heating means, illustrated as radio frequency heating coils 126, 128, and 130 are disposed between the inner wall of the tubular member and the outer wall of the melting chamber or "well" 114. As illustrated, the coils are made of hollow, metal tubing which is coupled, through electrically insulating couplings 132, 134, 136, 138, 148, and 150 to water feed lines 140, 142, 144 and return line 146 through which de-ionized water is pumped at appropriate rates to cool the heating coil to below the melting point of the coil metal and, if need be, to cool one or more parts of the pyrometallurgical apparatus while heating other parts thereof.

Each of the heating coils is connected to a common electrical return line 152 at one end of the coil, but the other end of each coil is connected to separate electrical leads 154, 156 and 158 which are in turn coupled to a suitable electrical energizing source or sources and electrical control devices (not shown).

The insulation 160 in the wall and bottom of the tubular member 106 prevents excessive heat loss through the walls thereof while the apparatus 18 is in operation.

While the electrical lines and water lines going to and from the lower section 20 of the apparatus 18 have been shown diagrammatically as passing through the walls of the member 106, the leads and lines may be passed through a suitably designed header similar to the header 56, or by any other suitable way which will permit the section 20 to be substantially air tight when in operation.

A tubular, elongated graphite crucible 162 is fitted within the upper part of the melting chamber 114 with its lower end resting on inwardly extending supports 164 near the upper end of the intermediate section 118. The upper end 166 of the crucible 162 extends into the header 56 and the space between the outer wall of the crucible 162 and the wall of the bore 74 of the header is closed by the O ring seal 104 previously referred to. A notched section 168 at the top of the crucible 162 permits a probe or other attaching instrument (not shown) to be attached to the crucible for removing it from or placing it into the apparatus 18. The lower end or bottom 190 of the crucible 162 comprises a graphite filter which may be press fitted into the crucible or held in place by any other suitable means.

The header 56 contains a pair of vacuum or gas lines 170, 172 which communicate with the interior bore 74 of the header. The lines 170, 172 each have a charcoal or other suitable filter 174, 176 along their length and are connected, by means of valves 178, 180 and 182, 184 respectively, to vacuum means 84 or inert gas sources 186 or 188. The line 170 enters the bore 74 above the O ring 104 while the line 172 enters the bore 74 below the O ring 104. With such an arrangement the chamber 114 may be evacuated or flushed with inert gas through the line 172 and the crucible 162 may be either evacuated or flushed with inert gas. Also, one vessel may be under evacuation while the other vessel is under pressure to encourage the passage of materials through the filter 190.

Fig. 3 illustrates a modification of the apparatus shown in Fig. 2. A second crucible 192 is telescoped within the crucible 162a and has an outwardly extending flange 194 which is sealed to the wall of the bore 74a of the header 56a by means of an O ring 196.

Each of the crucibles 162a, 192 have hooking means 198, 200 respectively adjacent to their upper ends. Vacuum or gas line inlets 202, 204, 206 are provided to communicate with the bore 74a to permit selective evacuation or gas purging of the chamber 116a or crucibles 162a or 192. As is apparent, the reference numerals in Fig. 3 which have an "a" following the number refer to parts which correspond to similar parts in Fig. 2.

In operation a materials testing reactor element 40 from a conveyor 38 (which may or may not extend to a pool adjacent to a reactor) is trimmed in the cutting device 42 to remove the ends and/or other parts of the casing of the element which need no metallurgical treatment. The trimmed element is then grasped by the jaws of the hoist 46 and drawn into the cooling and drying chamber 44 where air is introduced to both cool and dry the element 40.

The lower section 20 of the metallurgical apparatus 18 is lowered away from the stationary upper section 24 by means of the jacks 30 and is transported, by means of the cart 22 to which it is coupled, to a position under the cooling chamber 44. With the chamber or well 114 in place in the tubular member 106 (moved by means of the hoist 52 when one of the "plugs" 54 is removed) and the crucible 162 telescoped within the upper section 116, the element 40 is lowered into the crucible 162. The lower section 20 is then moved back under the upper section 24 and raised so that the upper end of the crucible having the O ring 104 extends into and seals against the bore 74 of the header 56 and also seals the O ring 62 against the lower surface 58 of the header 56.

With the valve 66 closed a vacuum is drawn through the lines 170, 172. Deionized cooling water is flowed through the coil 126 from the water inlet tube 140 and the coil is heated by supplying radio frequency energy (from a source not shown) to the coil 126 through the lead 154.

As the element 40 is heated line 172 is valved closed and the vacuum on line 170 continued in order to draw volatile impurities from the crucible 162 as the element 40 melts. As mentioned previously, a charcoal or other suitable filter (174 in the line 170) is coupled to each of the vacuum lines to trap volatile radioactive material.

With the top cap 72 removed from the tubular member 70 and the valve 68 opened, a magnesium bar (not shown) attached to the probe 90 is inserted into the member 70. The cap 72 is then coupled to the member 70 which is then evacuated.

Then, with the valve 66 opened, the magnesium bar 202 may be lowered by means of the rod 88 into the crucible 162 where it is melted and mixed with the molten element 40. Mixing is promoted by means of the paddle 90 on the rod 88 and/or by sparging with inert gas (through the filter 190) by means of the line 172 while line 170 is under at least a slight degree of evacuation.

Upon bringing molten magnesium into contact with the uranium-aluminum melt, most of the uranium precipitates as a uranium-aluminum intermetallic compound. Upon allowing the contents of the crucible 162 to cool, more uranium-aluminum intermetallic compound precipitates.

Satisfactory recoveries of uranium are obtained by carrying out the separation of uranium-aluminum intermetallic compound from the concomitant melt at a temperature within 200 centigrade degrees above the freezing point of the magnesium metal-aluminum melt, but preferably within 100 centigrade degrees above the freezing point of the melt.

The major part of the radioactive fission products remain in the melt and may be urged through the porous graphite filter 190 by pressure exerted through the line 170 and vacuum being applied through the line 172.

The material passing through the filter 190 passes into the lower tubular section 120 and into the tubelets 124.

To remove even more of the contaminants from the uranium-aluminum intermetallic precipitate additional amounts of magnesium and/or aluminum may be placed in the crucible 162 and additional melting, stirring, precipitating and filtering sequences done.

The alloy containing the radioactive contaminants are transferred to the tubelets 124, and cooling water is circulated through the coils 130 to prevent overheating of the tubelets due to heat generated by their radioactive contents. If, however, it is desirable to distil the magnesium from the alloy containing the radioactive contaminants, the coil 130 may be electrically energized to heat the tubelets while the coil 128 surrounding the section 120 is cooled. Thus the magnesium may be distilled from the tubelets and will collect on the cooled walls of the section 120.

The uranium-aluminum intermetallic precipitate may be recovered by later sacrificing the graphite crucible 162. Alternatively, in event the crucible has slightly diverging walls in the upward direction, a small amount of magnesium may be added to the crucible and heated to form a small amount of magnesium-aluminum melt which is then sparged to loosen the contents of the crucible from the filter 190 and walls of the crucible and allowed to harden around a probe (not shown, but which may be attached to the rod 88) and the alloy and precipitate removed from the crucible through the bore 74.

The lower section 20 of the apparatus 18 is then parted from the header 56 and moved under one of the "plugs" 54. The "plugs" 54 is opened and a suitable inverted T-shaped tool, not shown, is lowered and hooked onto the crucible 162 which is then removed. The entire melting chamber or well 114 is then removed and the tubelets are welded closed at their upper ends and cut free by the welding and cutting device 48 (Fig. 1). The sealed tubelets are then loaded into the lead shielded cart 50 for storage or movement to another area.

It is anticipated that the sealed tubelets 124 of radioactive material will be saleable as radiation sources for industrial, research, or medical usage.

The use of the apparatus of this invention has been thus far described in connection with the processing of MTR fuel elements although other type elements may be used. The modification shown in Fig. 3 is especially useful for use with elements or parts thereof in which metal parts such as element cladding, etc. which don't melt at the processing temperatures are retained in the crucible 192 while the molten part of the element passes through the porous filter in the bottom of the crucible 192 and into the crucible 162a. The crucible 192 may then be removed and processing of the element continued as heretofore described.

While the method of using the apparatus of this invention has been only briefly described herein, the method(s) disclosed in detail and claimed in my copending application, Serial No. 757,419, entitled "Process for Recovering Uranium Values," filed August 26, 1958, now abandoned, may be practiced in this apparatus.

What is claimed is:

1. Apparatus for pyrometallurgically processing nuclear fuel elements comprising, in a shielded housing, an air cooling chamber, hoisting means for drawing to and lowering from said chamber a fuel element to be processed, pyrometallurgical apparatus comprising an upper section and a lower section, means for moving said lower section with respect to said upper section, said upper section comprising a header, said header having an upper end, a lower bearing surface and an axial bore, means for cooling said bearing surface, separate gas passage means adjacent to said upper end and adjacent to said bearing surface, a hollow tubular structure, said tubular structure having an upper end and an open end aligned with the axial bore of the header and sealed to the header, said tubular structure having a first valve disposed adjacent to said header and a second valve disposed between the first valve and said upper end of the tubular structure, each of said valves being adapted to completely close the hollow part of said structure, gas passage means communicating with the hollow part of said structure between said first and second valves, closure means for the upper end of said tubular structure, said closure means having a centrally disposed bore extending therethrough, said bore being surrounded at one end by a packing gland, a rod-like probe extending through said centrally disposed bore and packing gland, said lower section comprising an elongated hollow chamber having thermally insulated liquid impervious side walls and bottom and an outwardly extending flange having a sealing surface at the upper part thereof, the hollow chamber being substantially larger in transverse cross section than the axial bore of the header, said hollow chamber having disposed therein three heating and cooling coils, the coils being spaced apart in end to end relationship within the chamber, a multiple section treating chamber, said treating chamber having a crucible receiving upper part having a flanged upper end adapted to be sealed against said header, an intermediate part and a lower part composed of a plurality of tubelets each communicating with the intermediate part, each of the parts of the treating chamber being aligned in side by side relationship with and surrounded by one of said heating and cooling coils, a crucible having an open upper end, side walls and a porous bottom, said crucible being telescoped into the upper part of the treating chamber and having its upper end sealed to said header between the gas passage means thereof, means for changing the temperature of said heating and cooling coils in a predetermined manner, and means for controlling the rate and direction in which gas is drawn through each of said gas passages.

2. Apparatus in accordance with claim 1, wherein said crucible and filter are made of graphite.

3. Apparatus in accordance with claim 1, wherein means are provided for sealing and removing said tubelets from said treating chamber.

4. Apparatus in accordance with claim 1, wherein said probe contains at least one thermocouple.

5. Apparatus in accordance with claim 1, wherein a second crucible is adapted to telescope within said first mentioned crucible and seal against said header.

(References on following page)

References Cited in the file of this patent

UNITED STATES PATENTS

| | | |
|---|---|---|
| 2,564,337 | Maddex | Aug. 14, 1951 |
| 2,771,357 | Wroughton | Nov. 20, 1956 |
| 2,877,109 | Spedding | Mar. 10, 1959 |
| 2,878,008 | Ishizuka | Mar. 17, 1959 |

FOREIGN PATENTS

| | | |
|---|---|---|
| 588,434 | Great Britain | May 22, 1947 |

OTHER REFERENCES

Symposium on the Reproducing of Irradiated Fuels, held at Brussels, Belgium, May 20–25, 1957, book 3, pages 809–814.